US012637533B1

(12) United States Patent
Zhao et al.

(10) Patent No.: US 12,637,533 B1
(45) Date of Patent: May 26, 2026

(54) MODIFIED ASPARTATE RESIN AND AQUEOUS DISPERSION

(71) Applicant: SHENZHEN FEIYANG PROTECH CORP., LTD, Shenzhen (CN)

(72) Inventors: Poli Zhao, Shenzhen (CN); Jiang Wu, Shenzhen (CN); Linna Che, Shenzhen (CN); Xiaoyong Qiu, Shenzhen (CN); Shankai Luo, Shenzhen (CN); Longhui Zhu, Shenzhen (CN)

(73) Assignee: SHENZHEN FEIYANG PROTECH CORP., LTD, Shenzhen (CN)

( * ) Notice: Subject to any disclaimer, the term of this patent is extended or adjusted under 35 U.S.C. 154(b) by 0 days.

(21) Appl. No.: 19/381,160

(22) Filed: Nov. 6, 2025

Related U.S. Application Data

(63) Continuation of application No. PCT/CN2025/122877, filed on Sep. 22, 2025.

(30) Foreign Application Priority Data

Jun. 26, 2025 (CN) ......................... 202510869480.3

(51) Int. Cl.
*C08G 18/42* (2006.01)
*C08G 18/08* (2006.01)
*C08G 18/10* (2006.01)

(52) U.S. Cl.
CPC ..... *C08G 18/4241* (2013.01); *C08G 18/0866* (2013.01); *C08G 18/10* (2013.01)

(58) Field of Classification Search
None
See application file for complete search history.

(56) References Cited

U.S. PATENT DOCUMENTS

| | | | | |
|---|---|---|---|---|
| 7,253,252 | B2 * | 8/2007 | Kohler | C09D 175/02 528/61 |
| 2006/0014922 | A1 | 1/2006 | Kohler et al. | |
| 2016/0060380 | A1 | 3/2016 | Laas et al. | |
| 2025/0129262 | A1 * | 4/2025 | Ok | C08G 18/3234 |

FOREIGN PATENT DOCUMENTS

| | | | | | |
|---|---|---|---|---|---|
| CN | 106029729 | A | | 10/2016 | |
| CN | 111303368 | A | | 6/2020 | |
| CN | 111635519 | A | | 9/2020 | |
| CN | 117801270 | A | * | 4/2024 | C08G 18/6415 |
| CN | 118834587 | A | | 10/2024 | |
| CN | 119081049 | A | | 12/2024 | |
| CN | 119875056 | A | | 4/2025 | |
| CN | 120504806 | A | | 8/2025 | |

OTHER PUBLICATIONS

English translation of CN-117801270-A (Year: 2024).*
English translation of CN-119081049-A (Year: 2024).*
International Search Report received in corresponding International patent application No. PCT/CN2025/122877, mailed Mar. 18, 2026, 8 pages.

* cited by examiner

*Primary Examiner* — Randy P Gulakowski
*Assistant Examiner* — Audra J Destefano
(74) *Attorney, Agent, or Firm* — Cooper Legal Group, LLC

(57) ABSTRACT

Disclosed are a modified aspartate resin and an aqueous dispersion, which relate to the technical field of aqueous emulsion. The modified aspartate resin is obtained by reacting a hydrophilic aspartate resin with a polyisocyanate compound, followed by reaction with a hydrophobic aspartate resin. The modified aspartate resin exhibits moderate hydrophilicity, enabling self-emulsifying dispersion in water to form an aqueous dispersion. The film formed from the aqueous dispersion after curing shows good water resistance.

8 Claims, No Drawings

MODIFIED ASPARTATE RESIN AND AQUEOUS DISPERSION

CROSS-REFERENCE TO RELATED APPLICATION

The present application is a continuation of PCT application serial no. PCT/CN2025/122877, filed on Sep. 22, 2025, which claims the priority benefits of China patent application No. 202510869480.3, filed on Jun. 26, 2025. The entireties of PCT application serial no. PCT/CN2025/122877 and China patent application No. 202510869480.3 are hereby incorporated by reference herein and made a part of this specification.

TECHNICAL FIELD

The present application belongs to the technical field of aqueous emulsion, and relates to a modified aspartate resin and an aqueous dispersion.

BACKGROUND ART

The development of aqueous aspartic polyurea coatings is an important direction in the field of aspartic polyurea, which can combine the characteristics and advantages of both aqueous coatings and aspartic polyurea coatings. Aqueous polyurea coatings are generally obtained by mixing an aqueous aspartate resin emulsion with an isocyanate curing agent. Some preparation methods of aqueous aspartate resins have been reported in the prior art, all of which introduce polyethylene glycol segments with good hydrophilicity onto the ester bonds of aspartate resins, for example, by grafting polyethylene glycol monoalkyl ether onto aspartate resins via transesterification reaction, or by conducting Michael addition reaction between maleic acid polyethylene glycol monoalkyl ester and a polyamine compound. For instance, Chinese patent CN111635519A reports synthesizing a hydrophilic maleate through transesterification reaction between maleate and methoxypolyethylene glycol, followed by reaction with a primary amine to obtain an aqueous aspartic acid resin, which is then mixed with an isocyanate curing agent to yield an aqueous aspartic polyurea coating. However, the aqueous aspartate resins prepared by such methods exhibit excessive hydrophilicity, leading to insufficient water resistance and poor corrosion resistance in the cured coatings of aqueous aspartic polyurea coatings.

Therefore, further research and improvement on aspartate resin emulsions are necessary.

SUMMARY

For the above objectives, the present application provides a modified aspartate resin and an aqueous dispersion.

The present application further provides an aqueous coating.

The technical solution of the present application is as follows:

A method for preparing a modified aspartate resin, including the following steps:

S1: reacting a hydrophilic aspartate resin with a polyisocyanate compound to obtain a first resin containing NCO groups, wherein the hydrophilic aspartate resin contains a polyethylene glycol segment; and S2: reacting the first resin obtained in the step S1 with a hydrophobic aspartate resin to obtain the modified aspartate resin.

Preferably, a structure of the hydrophilic aspartate resin in the step S1 is as shown in formula (1), (1)

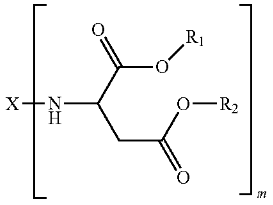

wherein X is selected from non-ionic m-valent organic groups having a number-average molecular weight of 50-5000 and containing no more than two heteroatoms, which are reaction-inert with isocyanate groups at 100° C., at least one of $R_1$ and $R_2$ contains the polyethylene glycol segment, and m is 2, 3, or 4.

More preferably, a structure of the polyethylene glycol segment is as shown in formula (2):

$$-(CH_2CH_2O)_p(CH_2CHCH_3O)_qR_3 \quad (2)$$

wherein p≥5, q≥0, p-q≥5, and $R_3$ is selected from $C_1$-$C_8$ alkyl.

More preferably, both $R_1$ and $R_2$ contain the polyethylene glycol segment;

or, the $R_1$ contains the polyethylene glycol segment, and the $R_2$ is selected from $C_1$-$C_8$ hydrocarbyl groups.

Preferably, in the step S1, a molecular weight of the polyisocyanate compound does not exceed 2500, and a structure of the polyisocyanate compound contains 2 to 3 isocyanate groups.

More preferably, the polyisocyanate compound is obtained by reacting a diisocyanate monomer with at least one of polyester diol, polyether diol or polyether polyamine.

Preferably, in the step S1, a molar ratio of NH groups in the hydrophilic aspartate resin to NCO groups in the polyisocyanate compound is 1:1.2-3.

Preferably, in the step S2, a structure of the hydrophobic aspartate resin is as shown in formula (3), (3)

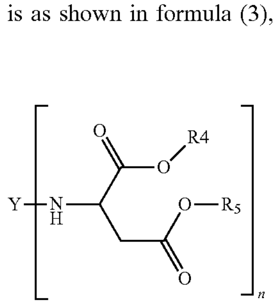

wherein Y is selected from non-ionic n-valent organic groups having a number-average molecular weight of 50-5000 and containing no more than two heteroatoms, which are reaction-inert to the isocyanate groups at 100° C.; $R_4$ and $R_5$ are independently selected from $C_1$-$C_8$ hydrocarbyl groups; n is 2, 3, or 4.

Preferably, in the step S2, a molar ratio of NCO groups in the first resin to NH groups in the hydrophobic aspartate resin is 1:0.8-1.3.

An aqueous dispersion, wherein the aqueous dispersion is obtained by emulsifying and dispersing the modified aspartate resin prepared by the method for preparing the modified aspartate resin according to any one of the above implementing solutions in water.

Advantageous effects of the present application are:

(1) The present application uses the hydrophilic aspartate resin and the polyisocyanate compound to form the first resin containing NCO groups, which then reacts with the hydrophobic aspartate resin to obtain the modified aspartate resin with suitable hydrophilicity. The modified aspartate resin can undergo self-emulsifying dispersion in water to form a stable aqueous dispersion, and the cured film of the aqueous dispersion exhibits good water resistance, adhesion, and other properties.

(2) The modified aspartate resin of the present application can have a relatively high molecular weight, enabling the resulting aqueous dispersion to form films without requiring additional curing agents, and the resulting films show excellent adhesion and water resistance. If the molecular weight of the modified aspartate resin is not sufficiently high, an isocyanate curing agent may be added to the aqueous dispersion to facilitate curing and film formation.

DETAILED DESCRIPTION

The following further describes and illustrates the technical solutions of the present application through specific embodiments.

On one hand, the present application proposes a method for preparing a modified aspartate resin, which includes the following steps:

S1: reacting a hydrophilic aspartate resin with a polyisocyanate compound to obtain a first resin containing NCO groups, wherein the hydrophilic aspartate resin contains a polyethylene glycol segment; and S2: reacting the first resin obtained in the step S1 with a hydrophobic aspartate resin to obtain the modified aspartate resin.

In the modified aspartate resin of the present application, the hydrophilic groups originate from the hydrophilic groups (polyethylene glycol segments) in the hydrophilic aspartate resin. After the hydrophilic aspartate resin reacts with the polyisocyanate compound and subsequently with the hydrophobic aspartate resin, the resulting modified aspartate resin possesses the following characteristics: higher molecular weight and lower but appropriate hydrophilicity. Higher molecular weight implies better performance (e.g., improved water resistance and adhesion) after film formation and curing of the aqueous dispersion, and allows formulation as a one-component system; lower but appropriate hydrophilicity enables self-emulsifying dispersion in water and results in better water resistance of the film.

In some embodiments, a structure of the hydrophilic aspartate resin in the step S1 is as shown in formula (1), (1)

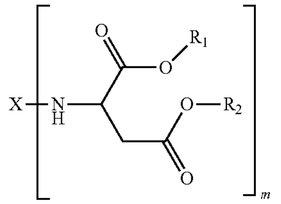

wherein X is selected from non-ionic m-valent organic groups having a number-average molecular weight of 50-5000 and containing no more than two heteroatoms, which are reaction-inert with isocyanate groups at 100° C., at least one of $R_1$ and $R_2$ contains the polyethylene glycol segment, and m is 2, 3, or 4.

In the present application, the hydrophilic groups of the hydrophilic aspartate resin are obtained by chemically bonding polyethylene glycol segments to ester groups. The preparation method of the above-mentioned hydrophilic aspartate resin is not particularly limited; for example, it can be obtained by a Michael addition reaction between a polyamine compound X $(NH_2)_m$ and polyethylene glycol maleate (monoester or diester), or it can be obtained by a transesterification reaction between an aspartate resin (such as F420 resin, F520 resin from Feiyang Junyan Company) and a polyethylene glycol monoalkyl ester (such as methoxypolyethylene glycol (MPEG)). In the present application, X is not particularly limited and may be structures such as

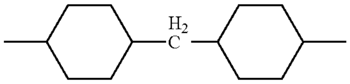,

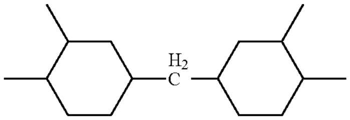,

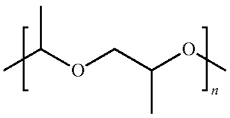, 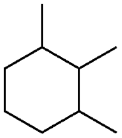, 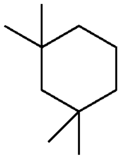,

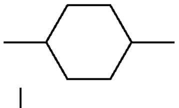, 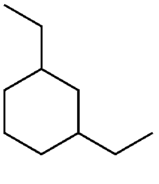,

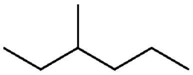, , etc.

In some embodiments, a structure of the polyethylene glycol segment is as shown in formula (2):

$$—(CH_2CH_2O)_p(CH_2CHCH_3O)_qR_3 \quad (2)$$

wherein p≥5, q≥0, p-q≥5, and $R^3$ is selected from $C_1$-$C_8$ alkyl.

The above polyethylene glycol segment exhibits good hydrophilicity. Examples include values of p and q such as p=5, q=0; p=8, q=0; p=10, q=2; p=10, q=4; p=15, q=3; p=15, q=8; p=20, q=0; p=20, q=6; p=20, q=10, etc., with no particular limitation.

In some embodiments, both the $R_1$ and $R_2$ contain the polyethylene glycol segment;

or the $R_1$ contains the polyethylene glycol segment, and the $R_2$ is selected from $C_1$-$C_8$ hydrocarbyl groups.

When both the $R_1$ and $R_2$ contain the polyethylene glycol segment, the hydrophilicity of the hydrophilic aspartate resin is relatively high; when only the $R_1$ contains the polyethylene glycol segment and $R^2$ is, for example, ethyl, the hydrophilicity of the hydrophilic aspartate resin varies depending on the hydrophilicity of the polyethylene glycol segment, the higher the hydrophilicity of the polyethylene glycol segment, the greater the hydrophilicity of the hydrophilic aspartate resin.

In some embodiments, in the step S1, a molecular weight (number-average molecular weight) of the polyisocyanate compound does not exceed 2500, and a structure of the polyisocyanate compound contains 2 to 3 isocyanate groups. If the molecular weight of the polyisocyanate compound is too high, the activity of the terminal NCO groups will be low, resulting in relatively low reactivity with the hydrophilic aspartate resin. The polyisocyanate compound used in the present application is not particularly limited. It may be a diisocyanate monomer such as IPDI, HMDI, HDI, MDI, etc., or it may be obtained by reacting the aforementioned diisocyanate monomers with at least one of polyester diol, polyether diol, or polyether polyamine. Examples include adducts of IPDI with polycarbonate diol (number-average molecular weight 400-2000), adducts of HMDI with polycaprolactone diol (number-average molecular weight 400-2000), adducts of IPDI with polytetrahydrofuran ether diol, adducts of IPDI with polyoxypropylene ether diol, adducts of HDI with polyetheramine, etc. Methods for preparing these adducts are well known to a person skilled in the art.

In some embodiments, a molar ratio of NH groups in the hydrophilic aspartate resin to NCO groups in the polyisocyanate compound in the step S1 is 1:1.2-3. The NCO groups in the polyisocyanate compound are in excess relative to the NH groups in the hydrophilic aspartate resin, and the first resin obtained contains unreacted NCO groups, which can further react with the hydrophobic aspartate resin to obtain the modified aspartate resin. For example, the molar ratio of NH groups in the hydrophilic aspartate resin to NCO groups in the polyisocyanate compound may be any value selected from 1:1.2, 1:1.4, 1:1.5, 1:1.7, 1:1.8, 1:2, 1:2.2, 1:2.3, 1:2.5, 1:2.7, 1:2.8, and 1:3, with no particular limitation. Further, the molar ratio may be 1:1.2-1.8.

In some embodiments, in the step S2, the hydrophobic aspartate resin does not contain hydrophilic structures, such as polyethylene glycol segments, sulfonate, sulfate, carboxylate, quaternary ammonium salt structures, phosphate structures, and the like, and a structure of the hydrophobic aspartate resin is as shown in formula (3), (3)

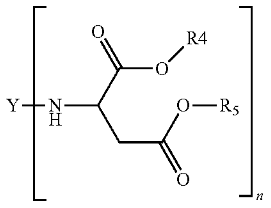

wherein Y is selected from non-ionic n-valent organic groups having a number-average molecular weight of 50-5000 and containing no more than two heteroatoms, which are reaction-inert to the isocyanate groups at 100° C.; $R_4$ and $R_5$ are independently selected from $C_1$-$C_8$ hydrocarbyl groups; n is 2, 3, or 4.

The above hydrophobic aspartate resin can be prepared according to existing technologies or directly obtained from the market, such as F420 resin, F520 resin, F421 resin, F220 resin, F330 resin, F2850 resin from Feiyang Junyan Company.

In some embodiments, in the step S2, a molar ratio of NCO groups in the first resin to NH groups in the hydrophobic aspartate resin is 1:0.8-1.3. For example, the molar ratio may be 1:0.8, 1:0.82, 1:0.85, 1:0.87, 1:0.9, 1:0.92, 1:0.95, 1:0.97, 1:0.98, 1:1, 1:1.02, 1:1.05, 1:1.07, 1:1.08, 1:1.1, 1:1.12, 1:1.15, 1:1.18, 1:1.2, 1:1.22, 1:1.25, 1:1.27, 1:1.3, etc., with no particular limitation. By adjusting the molar ratio of NCO groups in the first resin to NH groups in the hydrophobic aspartate resin, modified aspartate resins with different molecular weights can be obtained. Moreover, the modified aspartate resin has appropriate hydrophilicity, enabling effective self-emulsifying dispersion in water to form a stable emulsion. Further, the molar ratio of NCO groups in the first resin to NH groups in the hydrophobic aspartate resin may be 1:0.8-0.9. The resulting modified aspartate resin contains NCO groups, which react with water upon dispersion to generate primary amino groups. These primary amino groups can further react with NCO groups, thereby extending the chain and increasing the molecular weight of the modified aspartate resin. Thus, a one-component aqueous dispersion can be formulated. Further, the molar ratio of NCO groups in the first resin to NH groups in the hydrophobic aspartate resin may be 1:1.1-1.3. The resulting modified aspartate resin contains NH groups, which can continue to react with an isocyanate curing agent after dispersion in water, allowing formulation as a two-component aqueous dispersion.

On the other hand, the present application further provides an aqueous dispersion obtained by emulsifying and dispersing the modified aspartate resin prepared by the method for preparing the modified aspartate resin according to any one of the above implementing solutions in water. In the present application, a solid content of the aqueous dispersion may be 10-60 wt %, and the aqueous dispersion may be either a one-component or a two-component aqueous dispersion.

The aqueous dispersion of the present application can be further processed into an aqueous coating. An aqueous coating, based on weight parts, may include: 100 parts of the aqueous dispersion of the present application, 0-100 parts of pigment and filler, and 1-10 parts of additives. The aqueous dispersion of the present application uses the above-described modified aspartate resin as the main resin, which not only exhibits good hydrophilicity and excellent self-emulsifying capability, but also yields films with improved water resistance, adhesion, and other properties after curing. In the above aqueous coating, there is no particular limitation on the pigment and filler; pigments can be organic or inorganic pigments, such as phthalocyanine blue, phthalocyanine green, titanium dioxide, carbon black, iron oxide red, etc.; fillers can be inorganic or organic fillers; inorganic fillers include talc, kaolin, silica powder, cerium oxide, silicon dioxide, aluminum oxide, etc.; organic fillers include PE powder, PTFE powder, etc. The additive may include leveling agents, dispersants, anti-settling agents, thixotropic agents, wetting agents, defoamers, antioxidants, UV stabilizers, anti-yellowing agents, etc. Depending on the molecular weight and functional groups carried by the modified aspartate resin, the aqueous coating may be formulated as either a one-component or a two-component aqueous coating.

The following further describes and illustrates the technical solutions of the present application through various preparation examples and embodiments.

Preparation Examples 1-3: Preparation of Hydrophilic Aspartate Resin

Preparation Example 1

554 g of F420 resin (1 mol) and 1000 g of MPEG-500 (2 mol) were added into a four-necked flask, then 1 g of the catalyst butyltin oxide was added to obtain a mixture, and the mixture was reacted completely at 120° C. under a vacuum of −0.098 MPa; thus, a hydrophilic aspartate resin was obtained, which was designated as hydrophilic monomer 1.

Preparation Example 2

460 g of F220 resin (1 mol) and 1000 g of MPEG-1000 (1 mol) were added into a four-necked flask, then 1 g of the catalyst butyltin oxide was added to obtain a mixture, and the mixture was reacted completely at 120° C. under a vacuum of −0.098 MPa; thus, a hydrophilic aspartate resin was obtained, which was designated as hydrophilic monomer 2.

Preparation Example 3

554 g of F420 resin (1 mol) and 400 g of MPEG-200 (2 mol) were added into a four-necked flask, then 1 g of the catalyst butyltin oxide was added to obtain a mixture, and the mixture was reacted completely at 120° C. under a vacuum of −0.098 MPa; thus, a hydrophilic aspartate resin was obtained, which was designated as hydrophilic monomer 3.

Preparation Examples 4-7: Preparation of Polyisocyanate Compound

Preparation Example 4

109.2 g of HDI (eq: 1.3 mol) and 250 g of polycaprolactone diol (eq: 1 mol) with a hydroxyl content of 224.4 mgKOH/g were reacted at 100° C. for 6 hours to obtain a polyisocyanate compound with an NCO content of 3.5 wt %, which was designated as Isocyanate 1.

Preparation Example 5

1680 g of HDI (eq: 20 mol) and 1500 g of polyetheramine D2000 (eq: 1.5 mol) with an amine value content of 56.1 mgKOH/g were reacted at 80° C. for 1 h to obtain a polyisocyanate compound with an NCO content of 24.4 wt %, which was designated as isocyanate 2.

Preparation Example 6

227.5 g of IPDI (eq: 2.5 mol) and 500 g of polytetrahydrofuran ether diol (eq: 1 mol) with a hydroxyl content of 112.2 mgKOH/g were reacted at 80° C. for 12 h to obtain a polyisocyanate compound with an NCO content of 8.1 wt %, which was designated as isocyanate 3.

Preparation Example 7

327.5 g of HMDI (eq: 2.5 mol) and 500 g of poly (propylene carbonate) diol (eq: 0.5 mol) with a hydroxyl content of 56.1 mgKOH/g was reacted at 80° C. for 12 hours to obtain a polyisocyanate compound with an NCO content of 10.2 wt %, which was designated as isocyanate 4.

Example 1

Under nitrogen protection, the hydrophilic monomer 1 (eq: 1 mol) obtained from Preparation Example 1 was reacted with isocyanate 1 (eq: 1.4 mol) obtained from Preparation Example 4 at 90-100° C. until the disappearance of the NH group (monitored by FT-IR) to obtain the first resin.

Under nitrogen protection, the above first resin (eq: 1 mol) and F420 resin (eq: 1.3 mol) were reacted at 100-110° C. until the NCO groups were no longer detectable to obtain a modified aspartate resin.

The modified aspartate resin mentioned above was added to water, and a resulting mixture was stirred and dispersed for 30 minutes to prepare an aqueous dispersion with a concentration of 50 wt %.

Example 2

The difference between Example 2 and Example 1 is that in Example 2, an amount of F420 resin added is adjusted to 1.1 molar equivalents. The remaining steps remain unchanged.

Comparative Example 1

Aqueous polyaspartate resin was prepared according to the method of Example 1 of Chinese patent CN111303368A and added into stirred water. After the addition, stirring was continued for 10 min to obtain an aqueous dispersion with a concentration of 50 wt %. The aqueous dispersion obtained in this comparative example exhibited obvious flocculation and stratification after being stored at room temperature for 24 hours.

Comparative Example 2

The difference between Comparative Example 2 and Example 1 is that, in the preparation of the aqueous dispersion, the modified aspartate resin used in Example 1 is replaced with an equal weight of the first resin obtained in Example 1.

Comparative Example 3

The difference between Comparative Example 3 and Example 1 is that, in the preparation of the aqueous dispersion, the modified aspartate resin in Example 1 is replaced with an equal weight physical combination of the first resin (eq: 1 mol) from Example 1 and F420 resin (eq: 1.3 mol). The aqueous dispersion obtained in this comparative example exhibited obvious flocculation and stratification after being stored at room temperature for 24 hours.

Example 3

The difference between Example 3 and Example 1 is that in Example 1, the amount of F420 resin added is adjusted to 0.8 mole equivalents. The remaining steps remain unchanged.

Example 4

The difference between Example 4 and Example 1 is that in Example 1, the amount of F420 resin added is adjusted to 0.9 mole equivalents. The remaining steps remain unchanged.

Example 5

Under nitrogen protection, the hydrophilic monomer 2 (eq: 1 mol) obtained from Preparation Example 2 was reacted with isocyanate 2 (eq: 1.2 mol) obtained from Preparation Example 5 at 90-100° C. until the disappearance of the NH group to obtian a first resin.

Under nitrogen protection, the above first resin (eq: 1 mol) and F420 resin (eq: 1.2 mol) were reacted at 100-110° C. until the NCO groups were no longer detectable to obtain a modified aspartate resin.

The modified aspartate resin mentioned above was added to water, and a resulting mixture was stirred and dispersed for 30 minutes to prepare an aqueous dispersion with a concentration of 40 wt %.

Example 6

Under nitrogen protection, the hydrophilic monomer 3 (eq: 1 mol) obtained from Preparation Example 3 was reacted with isocyanate 3 (eq: 1.8 mol) obtained from Preparation Example 6 at 80-90° C. until the disappearance of the NH group to obtain a first resin.

Under nitrogen protection, the above first resin (eq: 1 mol) and F520 resin (eq: 1.3 mol) were reacted at 100-110° C. until the NCO groups were no longer detectable to obtain a modified aspartate resin.

The modified aspartate resin mentioned above was added to water, and a resulting mixture was stirred and dispersed for 30 minutes to prepare an aqueous dispersion with a concentration of 40 wt %.

Example 7

Under nitrogen protection, the hydrophilic monomer 3 (eq: 1 mol) obtained from Preparation Example 3 was reacted with isocyanate 4 (eq: 1.4 mol) obtained from Preparation Example 7 at 80-90° C. until the disappearance of the NH group to obtain a first resin.

Under nitrogen protection, the above first resin (eq: 1 mol) and F330 resin (eq: 0.85 mol) were reacted at 100-110° C. until the NCO groups were no longer detectable to obtain a modified aspartate resin.

The modified aspartate resin mentioned above was added to water, and a resulting mixture was stirred and dispersed for 30 minutes to prepare an aqueous dispersion with a concentration of 50 wt %.

Property Test

Stability test of aqueous dispersion: the aqueous dispersion to be tested was stored at 40° C. for 6 months, during which time stratification, emulsion breaking, oil floating, or other abnormalities were observed.

Particle size test of the aqueous dispersion: conducted using a Malvern laser particle size analyzer.

Coating glossiness test: the aqueous dispersion to be tested (except for Comparative Example 1, Example 3, Example 4, and Example 7) was mixed with a curing agent WL72-100 at an NCO to NH molar ratio of 1.1:1, and a resulting mixture was diluted with deionized water to a solid content of 45%, then sprayed onto a clean tinplate, cured at room temperature for 7 days, and then the coating glossiness was measured at a gloss of 60°. The aqueous dispersions of Examples 3, 4, and 7 were directly sprayed onto clean tinplates and cured at room temperature for 7 days, and then the coating glossiness was measured at a gloss of 60°.

Coating water resistance test: the aqueous dispersion to be tested (except for Comparative Example 1, Example 3, Example 4, and Example 7) was mixed with a curing agent WL72-100 at an NCO to NH molar ratio of 1.1:1, and a resulting mixture was diluted with deionized water to a solid content of 45%, then sprayed onto a clean tinplate, and cured at room temperature for 7 days. The aqueous dispersions of Examples 3, 4, and 7 were directly sprayed onto clean tinplates and cured at room temperature for 7 days. Half of the tinplate coated with the coating was immersed into water at 38° C., and after 48 hours, it was observed whether any abnormalities such as blistering, peeling, or edge lifting occur at the waterline.

Coating adhesion test: the aqueous dispersion to be tested (except for Comparative Example 1, Example 3, Example 4, and Example 7) was mixed with a curing agent WL72-100 at an NCO to NH molar ratio of 1.1:1, and a resulting mixture was diluted with deionized water to a solid content of 45%, then sprayed onto clean tinplates, and cured at room temperature for 7 days. The aqueous dispersions of Examples 3, 4, and 7 were directly sprayed onto clean tinplates and cured at room temperature for 7 days. Adhesion was tested using the cross-cut test. The adhesion grade was divided into 0 to 5 levels, wherein level 0 is the best and level 5 is the worst.

The results are as shown in Table 1.

TABLE 1

| | Stability of aqueous dispersion | Particle size of aqueous dispersion/ nm | Gloss/° | Water resistance | Cross-cut adhesion |
|---|---|---|---|---|---|
| Example 1 | Stable | 107 | 95 | No abnormality | Grade 0 |
| Example 2 | Stable | 72 | 93 | No abnormality | Grade 0 |
| Comparative Example 1 | Stable | 11 | 84 | Edge curling | Grade 2 |
| Comparative Example 2 | Stable | <1 | 71 | Edge peeling | Grade 3 |
| Example 3 | Stable | 14 | 90 | No abnormality | Grade 1 |
| Example 4 | Stable | 29 | 91 | No abnormality | Grade 1 |
| Example 5 | Stable | 346 | 95 | No abnormality | Grade 0 |
| Example 6 | Stable | 203 | 94 | No abnormality | Grade 0 |
| Example 7 | Stable | 42 | 92 | No abnormality | Grade 0 |

As can be seen from the data in Table 1, the aqueous dispersion obtained by self-emulsification of the modified polyaspartate resin of the present application exhibits good stability, and the cured coating has high gloss, excellent water resistance, and high adhesion.

As described above, the basic principles, main features and advantages of the present application are illustrated and described. It should be understood by a person skilled in the art that the present application is not limited by the above embodiments, which are merely preferred embodiments of the present application. The scope of protection of the present application should not be defined solely thereby. All equivalent changes and modifications made in accordance with the scope of the present application and the content of the specification shall still fall within the scope encompassed by the present application. The scope of protection sought by the present application is defined by the appended claims and their equivalents.

What is claimed is:

1. A method for preparing a modified aspartate resin, comprising the following steps:

S1: reacting a hydrophilic aspartate resin with a polyisocyanate compound to obtain a first resin containing NCO groups, wherein the hydrophilic aspartate resin contains a polyethylene glycol segment and a structure of the hydrophilic aspartate resin in the step S1 is as shown in formula (1), (1)

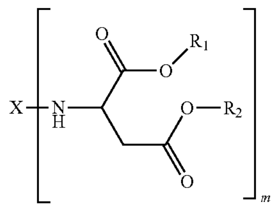

wherein X is selected from non-ionic m-valent organic groups having a number-average molecular weight of 50-5000 and containing no more than two heteroatoms, which are reaction-inert with isocyanate groups at 100° C., at least one of $R_1$ and $R_2$ contains the polyethylene glycol segment, and m is 2, 3, or 4; and S2: reacting the first resin obtained in the step S1 with a hydrophobic aspartate to obtain the modified resin.

2. The method for preparing the modified aspartate resin according to claim 1, wherein a structure of the polyethylene glycol segment is as shown in formula (2), $$—(CH_2CH_2O)_p(CH_2CHCH_3O)_qR_3 \quad (2)$$

wherein p≥5, q≥0, p-q≥5, and $R_3$ is selected from $C_1$-$C_8$alkyl.

3. The method for preparing the modified aspartate resin according to claim 1, wherein the $R_1$ and the $R_2$ both contain the polyethylene glycol segment;

or, the $R_1$ contains the polyethylene glycol segment, and the $R_2$ is selected from $C_1$-$C_8$ hydrocarbyl groups.

4. The method for preparing the modified aspartate resin according to claim 1, wherein in the step S1, a molecular weight of the polyisocyanate compound does not exceed 2500, and a structure of the polyisocyanate compound contains 2 to 3 isocyanate groups.

5. The method for preparing the modified aspartate resin according to claim 4, wherein the polyisocyanate compound is obtained by reacting a diisocyanate monomer with at least one of polyester diol, polyether diol or polyether polyamine.

6. The method for preparing the modified aspartate resin according to claim 1, wherein in the step S1, a molar ratio of NH groups in the hydrophilic aspartate resin to NCO groups in the polyisocyanate compound is 1:1.2-3.

7. The method for preparing the modified aspartate resin according to claim 1, wherein in the step S2, a structure of the hydrophobic aspartate resin is as shown in formula (3), (3)

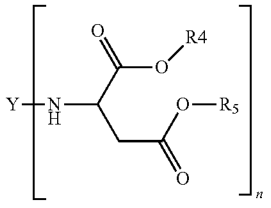

wherein Y is selected from non-ionic n-valent organic groups having a number-average molecular weight of 50-5000 and containing no more than two heteroatoms, which are reaction-inert to isocyanate groups at 100° C.; $R_4$ and $R_5$ are independently selected from $C_1$-$C_8$ hydrocarbyl groups; and n is 2, 3, or 4.

8. The method for preparing the modified aspartate resin according to claim 1, wherein in the step S2, a molar ratio of the NCO groups in the first resin to NH groups in the hydrophobic aspartate resin is 1:0.8-1.3.

* * * * *